United States Patent [19]

Takeda

[11] 4,411,169
[45] Oct. 25, 1983

[54] PEDAL FOR A BICYCLE

[75] Inventor: Nobumi Takeda, Sakai, Japan

[73] Assignee: Shimano Industrial Company Limited, Osaka, Japan

[21] Appl. No.: 85,950

[22] Filed: Oct. 18, 1979

[30] Foreign Application Priority Data

Nov. 11, 1978 [JP] Japan .................... 53-155523[U]

[51] Int. Cl.³ .............................................. G05G 1/14
[52] U.S. Cl. ................................. 74/594.4; 411/501;
411/907
[58] Field of Search ............... 74/560, 594.1, 594.4;
301/2.5; 403/408; 24/73 FA, 73 D, 73 MC, 83,
77 S; 411/500, 501, 907

[56] References Cited

U.S. PATENT DOCUMENTS

| 673,395 | 5/1901 | Hill et al. | 74/594.4 |
|---|---|---|---|
| 2,421,238 | 5/1947 | Borah | 411/500 X |
| 2,542,548 | 2/1951 | Matthias et al. | 74/594.4 |
| 2,568,443 | 9/1951 | Gerner et al. | 74/594.4 |
| 3,193,921 | 7/1965 | Kahn | 24/73 D |
| 3,807,255 | 4/1974 | Baginski | 74/594.4 |
| 3,856,050 | 12/1974 | Rooney | 411/907 X |

FOREIGN PATENT DOCUMENTS

| 828807 | 1/1952 | Fed. Rep. of Germany | 74/594.4 |
|---|---|---|---|
| 952327 | 11/1956 | Fed. Rep. of Germany | 74/594.4 |
| 971404 | 1/1959 | Fed. Rep. of Germany | 411/500 |
| 841469 | 5/1939 | France | 74/594.1 |
| 920499 | 4/1947 | France | 74/594.4 |
| 54127 | 11/1947 | France | 74/594.4 |
| 1025478 | 4/1953 | France | 74/594.4 |
| 1039997 | 10/1953 | France | 74/594.4 |
| 1054560 | 2/1954 | France | 74/594.4 |
| 2240480 | 3/1975 | France | 74/560 |
| 2436707 | 4/1980 | France | |
| 569949 | 6/1945 | United Kingdom | 411/500 |
| 1103458 | 2/1968 | United Kingdom | |

Primary Examiner—Kenneth Dorner
Attorney, Agent, or Firm—Stevens, Davis, Miller & Mosher

[57] ABSTRACT

A pedal for a bicycle, which has a pedal shaft supported rotatably to a crank arm, the pedal shaft carrying a frame which is displaced with respect to the axis of the pedal shaft and extends in parallel to the axis thereof. A pedal body is fit onto the frame to be fixed thereto, so that the frame may reinforce the pedal body and bear an unbalanced load applied thereto.

3 Claims, 3 Drawing Figures

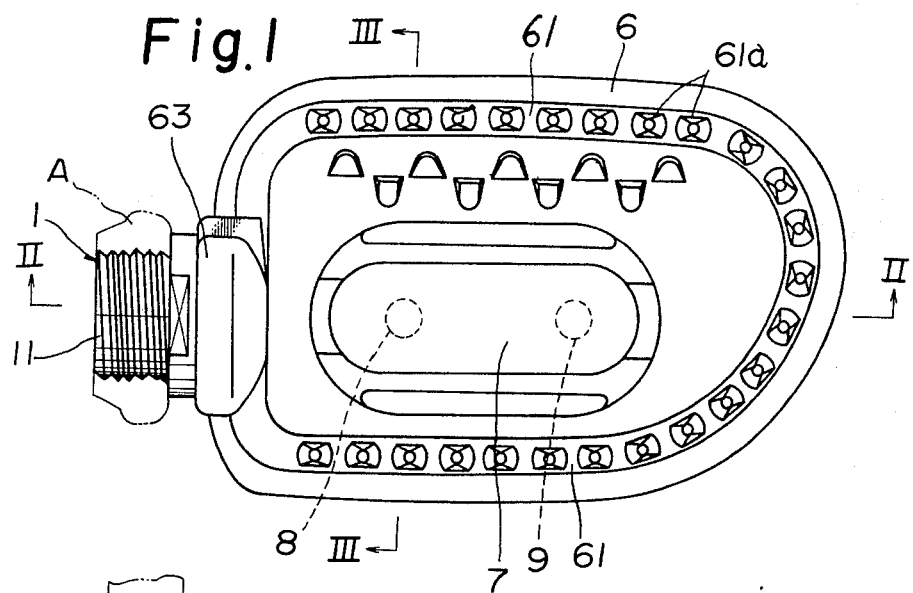
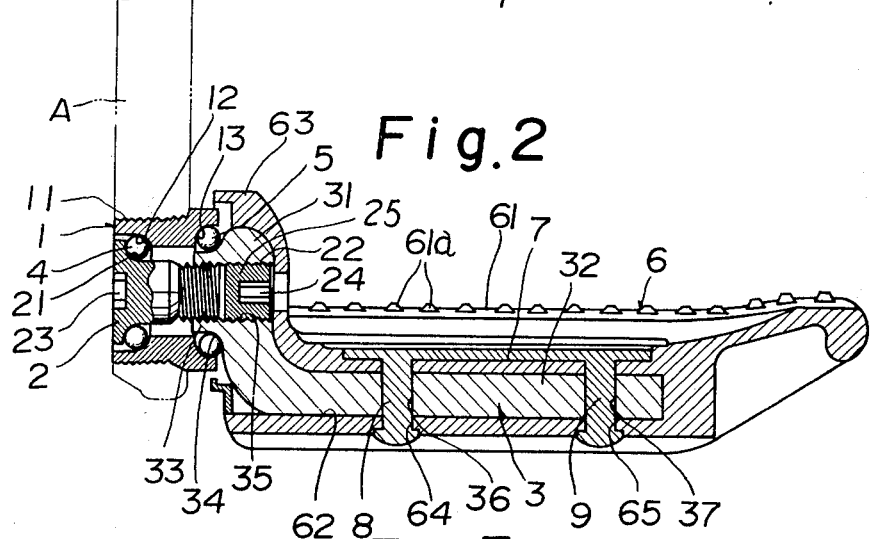
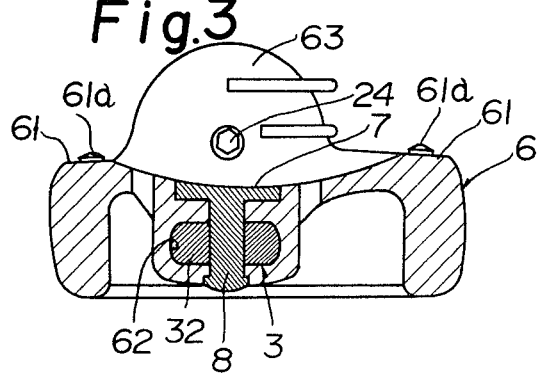

PEDAL FOR A BICYCLE

BACKGROUND OF THE INVENTION

This invention relates to a pedal for a bicycle, and more particularly to a pedal used mainly for a bicycle for children or a small-sized bicycle, generally called a "minicycle", having small diameter wheels.

Generally, a bicycle pedal is so constructed that a pedal body is fixed to a pedal shaft supported rotatably to a crank arm at the bicycle, or is supported rotatably to the pedal shaft fixed to the crank arm. The pedal, in either case, usually has a short pedal shaft which supports in cantilever fashion the pedal body displaced with respect to the axis of the pedal shaft.

In this construction, the pedal body, during pedalling, is subjected to a greater unbalanced load, especially concentrated at the body supporting portion. As a result, when an inexpensive synthetic resin or a lightweight material, such as aluminum alloy, is used to form the pedal body, the problem exists of breaking the pedal body.

Accordingly, a pedal body of synthetic resin or aluminum alloy for the conventional pedal, is made larger in thickness to increase its stiffness or is formed of other material, for example iron, of high stiffness.

However, even when formed specially of synthetic resin, the larger thickness pedal body has an increased weight leading to a high cost to manufacture. The use of material of high stiffness presents the same problem.

SUMMARY OF THE INVENTION

In order to overcome the aforesaid problems, this invention has been designed. A main object of the invention is to provide a bicycle pedal, especially for a bicycle for children or a minicycle, which pedal has a pedal body formed of an inexpensive and lightweight material, such as synthetic resin or aluminum alloy, while providing the pedal with a greater strength and durability. Another object of the invention is to provide a pedal having a pedal body easily assembled with the pedal shaft.

In detail, the pedal of the invention is so constructed that the pedal shaft is supported rotatably to a crank arm and carries a frame displaced with respect to the axis of the pedal shaft and extending in parallel to the axis thereof, and the pedal body is fit onto the frame so as to be fixed thereto, whereby the frame reinforces the pedal body and bears an unbalanced load acting thereon.

Hence, the pedal body of the invention need not have endurance strength and can be made of an inexpensive and lightweight synthetic resin or an aluminum alloy and also formed to be easily pedaled by a cyclist. Hence, the pedal of the invention becomes as a whole inexpensive and lightweight while using the frame, and is simple in assembly which occurs by merely fitting the pedal body onto the frame which is extending axially of the pedal shaft.

These and other objects and novel features of the invention will be more apparent from the following description of an embodiment thereof in accordance with the accompanying drawings.

BRIEF DESCRIPTION OF THE INVENTION

FIG. 1 is a plan view of an embodiment of a pedal of the invention,

FIG. 2 is a sectional view taken on the line II—II in FIG. 1, and

FIG. 3 is a sectional view taken on the line III—III in FIG. 1.

DESCRIPTION OF THE PREFERRED EMBODIMENT

Referring to the drawings, reference numeral 1 designates a bearing cylinder connected to a crank arm A at the bicycle, and numeral 2 designates a pedal shaft supported rotatably to the bearing cylinder 1. The bearing cylinder 1 comprises a cylinder of axial length slightly larger than the thickness of the crank arm A and has at the outer periphery a screw thread 11 screwable with a threaded bore at the crank arm A and at the inner periphery a pair of ball races 12 and 13 positioned at both axial ends of the bearing cylinder 1.

The pedal shaft 2 is slightly larger in axial length than the bearing cylinder 1, and is provided at the outer periphery with a ball race 21 positioned at one axial end and with a screw thread 22 positioned at the other axial end, and at the central portions of both end faces with a polygonal recess 23 for rotary control and a lock nut 25 having a polygonal recess 24 respectively.

Reference numeral 3 designates a frame fixed to the pedal shaft 2. The frame 3, as shown in FIG. 2, comprises a vertical portion 31 and a horizontal portion 32, and is formed in a substantially L-like shaped when viewed from the lateral side, and is made as a whoe from a stiff material, such as iron. The vertical portion 31 has a projection 33 extending axially of the pedal shaft 2. The projection 33 has at the outer periphery thereof a ball race 34 and has a central bore 35 axially extending and integrally threaded. The threaded bore 35 is screwed with the screw thread 22 at the pedal shaft 2 to thereby fix the frame 3 to thereto.

The horizontal portion 32 is displaced with respect to the axis of the pedal shaft 2 and extends at the foremost end in parallel to the axis of the pedal shaft 2. The horizontal portion 32, as shown in FIG. 3, is formed substantially rectangular in section, and the sectional rectangle extends horizontally at the long side thereof. Also, the horizontal portion 32 has at the lengthwise intermediate portion thereof two first through bores 36 and 37 extending vertically.

The frame 3, which is separate from the pedal shaft 2 and screwably fixed thereto, may be connected to the pedal shaft 2 by a press-fit or be previously integrated therewith. However, keeping the frame 3 separate from the bearing cylinder 1 and screwed therewith, is advantageous as the frame 3 is simply supported rotatably to the pedal shaft 2 through balls 4 and 5.

In detail, the pedal shaft 2 is screwed at the screw thread 22 thereof with the threaded bore 35 at the frame 3 so that the frame 3 engages with the pedal shaft 2 as shown in FIG. 2. Balls 4 and 5 are inserted between the ball race 12 at the bearing cylinder 1 and the ball race 21 at the pedal shaft 2 and between the ball race 13 at the bearing cylinder 1 and the ball race 34 at the frame 3 respectively, whereby the pedal shaft 2 and frame 3 are rotatably supported with respect to the bearing cylinder 1. Consequently, the screwable engagement of the pedal shaft 2 with the frame 3 facilitates adjustment of the frame 3 in its desired rotation condition.

When the pedal shaft 2 is integrated with the frame 3, the frame 3 has the same ball race as shown in FIG. 2, and a cone having a ball race is separately provided and screwed with the pedal shaft 2.

Reference numeral 6 designates a pedal body which is fit onto the frame 3 and fixed thereto. The pedal body 6 is formed in a block mainly of cheap, lightweight synthetic resin or aluminum alloy, and has at the surface thereof a foot bearing surface 61. Also, at a central portion of the pedal body 6 longitudinally of the bicycle, preferably at the portion toward the rear of pedal body with respect to the central portion, is provided a fitting bore 62 which extends transversely of the bicycle and opens at the side facing the crank arm A. The fitting bore 62 is closed at one end and is large enough to fit close to the frame 3, whereby the pedal body 6 is fit thereto through the fitting bore 62. In addition, the fitting bore 62 provided rearwardly rom the central portion, makes the pedal body 6 heavier at its front side than the rear side and imparts a forward, slightly downwardly slant to thereby facilitate easy pedalling.

The pedal body 6 has at its one side facing the crank arm A a head 63 covering the vertical portion 31 at the frame 3, and at a lengthwise intermediate portion two second through bores 64 and 65 perforating the body 6 and passing through the fitting bore 62. At the foot bearing surface 61 are provided a number of projections 61a. Since, the body 6 need not have endurance strength, it can be reduced in thickness and unnecessary portions thereof can be cut away.

Fixing means for fixing the pedal body 6 to the frame 3 may comprise pins inserted through the first through bores 36 and 64 and the second through bores 37 and 65 which are deformed at their ends, but it is preferred to form a member of synthetic resin, which comprises a plate 7 and projecting pins 8 and 9 integral therewith spaced at an interval coincident with that between the through bores 36 and 37 and between those 64 and 65. During assembly the pedal body 6 is inserted onto the frame 3, the first through bores 36 and 37 are matched with the second through bores 64 and 65 respectively, and thereafter the pins 8 and 9 pass through the first and second through bores and project at the tips from the second through bores. The projecting tips are heat-molten to be bound with the pedal body 6. In this instance, the pedal body 6 also is preferably to be made of synthetic resin, whereby the binding strength increases and the binding work is easy.

As clearly understood from the aforesaid description, the pedal of the invention has the frame attached to the pedal shaft, onto which frame the pedal body is fit and fixed. Therefore, the frame bears the load applied to the pedal body and the pedal body is free from the load. Hence, the pedal body can be formed of inexpensive and lightweight material, such as synthetic resin or aluminum alloy.

Also, since the frame bears the load, there is no fear that the pedal body is subjected to a greater unbalanced load so as to be damaged, as a result, the pedal body has an improved durability.

Furthermore, the pedal body, which is fit and fixed to the frame, is easy in assembly and provides a strong and lightweight pedal which is inexpensive to manufacture.

While as embodiment of the invention has been shown and described, the invention is not limited to the specific construction thereof, which is merely exemplified in the specification rather than defined.

What is claimed is:

1. A pedal for a bicycle, comprising:

a bearing cylinder having means for connecting said bearing cylinder to a bicycle crank arm;

a pedal shaft supported rotatably to said bearing cylinder, said pedal shaft supporting an L-shaped frame having a vertical portion connected to said pedal shaft and a rod-like horizontal portion of non-circular cross section displaced with respect to the axis of said pedal shaft and extending in the same direction as the axis of said pedal shaft, said frame having at said vertical portion a projecting portion extending in the same direction as the axis of said pedal shaft, said projecting portion having at a central portion thereof a threaded bore screwably connected with said pedal shaft and at the outer periphery thereof a ball race, said pedal shaft having a ball race at the outer periphery thereof, said ball races carrying balls which rotatably support said pedal shaft and frame to said bearing cylinder;

a pedal body comprising a main body portion and a pedal outline portion formed in continuation of said main body portion, said pedal body having on the upper surface thereof near an outer peripheral portion a foot bearing surface, said main body portion having at a substantially intermediate portion thereof a longitudinal fitting bore extending in the same direction as the axis of said pedal shaft and opening at a side facing said crank arm, said fitting bore having a non-circular cross section complementary to that of said frame and being large enough to receive therein and cover said frame so that said frame is fit into said fitting bore and covered by said pedal body to support said pedal body to said frame and to lock said pedal body from relative rotative movement with respect to said frame; and fixing means for fixing said pedal body to said frame.

2. A pedal for a bicycle according to claim 1, wherein said fitting bore is provided at a portion of said pedal body rearwardly with respect to a central portion thereof longitudinal of the bicycle to impart a forwardly directed tilt to said pedal.

3. A pedal for a bicycle according to claim 1, wherein said pedal body fixed to said frame has a head for covering said vertical portion at said frame.

* * * * *